(12) United States Patent
Weiss et al.

(10) Patent No.: US 9,363,390 B2
(45) Date of Patent: Jun. 7, 2016

(54) SYSTEM AND METHOD FOR CLASSIFYING MOBILE DEVICE USAGE

(71) Applicants: Andrew Weiss, San Ramon, CA (US); Tasos Roumeliotis, Orinda, CA (US)

(72) Inventors: Andrew Weiss, San Ramon, CA (US); Tasos Roumeliotis, Orinda, CA (US)

(73) Assignee: Location Labs, Inc., Emeryville, CA (US)

( * ) Notice: Subject to any disclaimer, the term of this patent is extended or adjusted under 35 U.S.C. 154(b) by 29 days.

(21) Appl. No.: 14/144,487

(22) Filed: Dec. 30, 2013

(65) Prior Publication Data

US 2015/0189095 A1 Jul. 2, 2015

(51) Int. Cl.
*H04M 15/00* (2006.01)

(52) U.S. Cl.
CPC .............. *H04M 15/41* (2013.01); *H04M 15/44* (2013.01); *H04M 15/58* (2013.01); *H04M 15/8033* (2013.01)

(58) Field of Classification Search
USPC .................. 455/405, 432.1, 433, 456.1, 456.2
See application file for complete search history.

(56) References Cited

U.S. PATENT DOCUMENTS

2012/0051352 A1* 3/2012 Morita et al. ................. 370/338

* cited by examiner

*Primary Examiner* — Sam Bhattacharya
(74) *Attorney, Agent, or Firm* — Dovas Law, P.C.

(57) ABSTRACT

A method for classifying use of a mobile device is provided. The method includes defining a list of telephone numbers, area codes, states, countries or geographic designations and detecting a plurality of communications to the mobile device or from the mobile device. The method further includes determining which of the plurality communications correspond to the list, classifying the plurality of communications into a classification based on whether they correspond to the list, and reporting the classifying of the plurality of communications.

24 Claims, 6 Drawing Sheets

SYSTEM AND METHOD FOR CLASSIFYING MOBILE DEVICE USAGE

FIELD OF INVENTION

This invention relates to mobile devices. More particularly, this invention relates to systems for classifying mobile device usage for billing.

BACKGROUND

Mobile devices such as cellular telephones, smart phones, GPS systems and cellular-enabled personal computers have become very common and very powerful. This combination of ubiquity and capability has created an ongoing demand for improved devices and unique applications, all of which means that a user will be spending even more time on his or her mobile device.

A typical mobile device operates as part of a communication network provided by a mobile telephone carrier. Such communication networks provide a host of basic services such as time keeping and access to the public telephone network. In addition to basic communications, a state-of-the-art mobile device, often referred to as a smartphone, will have many built in features such as communication ports, touch screen displays, keyboards, orientation sensors, accelerometers, cameras, one or more timers, microphones, audio outputs, memory card readers, significant internal memory, and specialized software. Such mobile devices can provide a wide range of functionality such as telephone communications, text messaging, calendars, alarms, memo and note recording, GPS navigation, music (MP3) and video (MP4) playback, video calling, conference calling, movie playback, picture taking and sending, games, e-mail, audio and video downloading, internet access and browsing, short range communications such as Bluetooth™, mobile banking, instant messaging and the ever-popular specialized ringtones.

Despite the wide range of capabilities of mobile devices in general, all uses can be grouped for convenience into 4 main categories: calling, text messaging, data transferring and internal applications. Of those categories calling, text messaging, and data transferring involve a mobile device user accessing the communication network (with the understanding that local data transferring such as via Blue-Tooth is an application not necessarily requiring connection to a network).

Accessing a mobile device's communication network is significant because the cost of the accessed service has to be paid. Calling, text messaging, and data transferring all run up time charges and on most communication networks the cost of each service is different. Mobile device communication networks may bill based on the total amount of time a category is used (phone call), the number of times a category is used (text messaging) or the amount of data that has been transferred (data transferring). As many mobile device users can attest such charges can add up quickly.

Many companies allow employees to bring and use their own mobile devices to work. Those mobile devices are often used for both personal and business related activities. This creates the problem of who pays for mobile device usage. Many employees and many companies do not want the employee to subsidize an employer's business by having the employee pay for the company's communications. Likewise many companies do not want to pay for their employees' personal mobile device usage. Even in the case where flat rate billing is applied without regard to a users use, it may still be desirable to an employer or employee to allocate the flat rate depending on whether device use is personal or business related.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method for classifying use of a mobile device is provided. The method includes defining a list of telephone numbers, area codes, states, countries or geographic designations and detecting a plurality of communications to the mobile device or from the mobile device. The method further includes determining which of the plurality communications correspond to the list, classifying the plurality of communications into a classification based on whether they correspond to the list, and reporting the classifying of the plurality of communications.

A computing system is provided comprising at least one non-transitory computer readable storage medium having encoded thereon instructions that, when executed by one or more processors of the system, cause the system to perform a process. The process includes defining a list of telephone numbers, area codes, states, countries or geographic designations and detecting a plurality of communications to the mobile device or from the mobile device. The process further includes determining which of the plurality communications correspond to the list, classifying the plurality of communications into a classification based on whether they correspond to the list, and reporting the classifying of the plurality of communications.

Non-transitory computer-readable media is provided tangibly embodying a program of instructions executable by at least one processor-enabled computing system to implement a method, the at least one computing system being capable of interfacing with a communications network. The method includes defining a list of telephone numbers, area codes, states, countries or geographic designations and detecting a plurality of communications to the mobile device or from the mobile device. The method further includes determining which of the plurality communications correspond to the list, classifying the plurality of communications into a classification based on whether they correspond to the list, and reporting the classifying of the plurality of communications.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIG. 1 presents a diagram of a network system that is suitable for classifying and invoicing in a business use classification system;

DETAILED DESCRIPTION OF ILLUSTRATIVE EMBODIMENT(S)

The terms "a" and "an" as used herein do not denote a limitation of quantity, but rather denote the presence of at least one of the referenced items. Any directional signal such as top, bottom, left, right, upper and lower are taken with reference to the orientation shown in FIG. 1.

Figure 1:
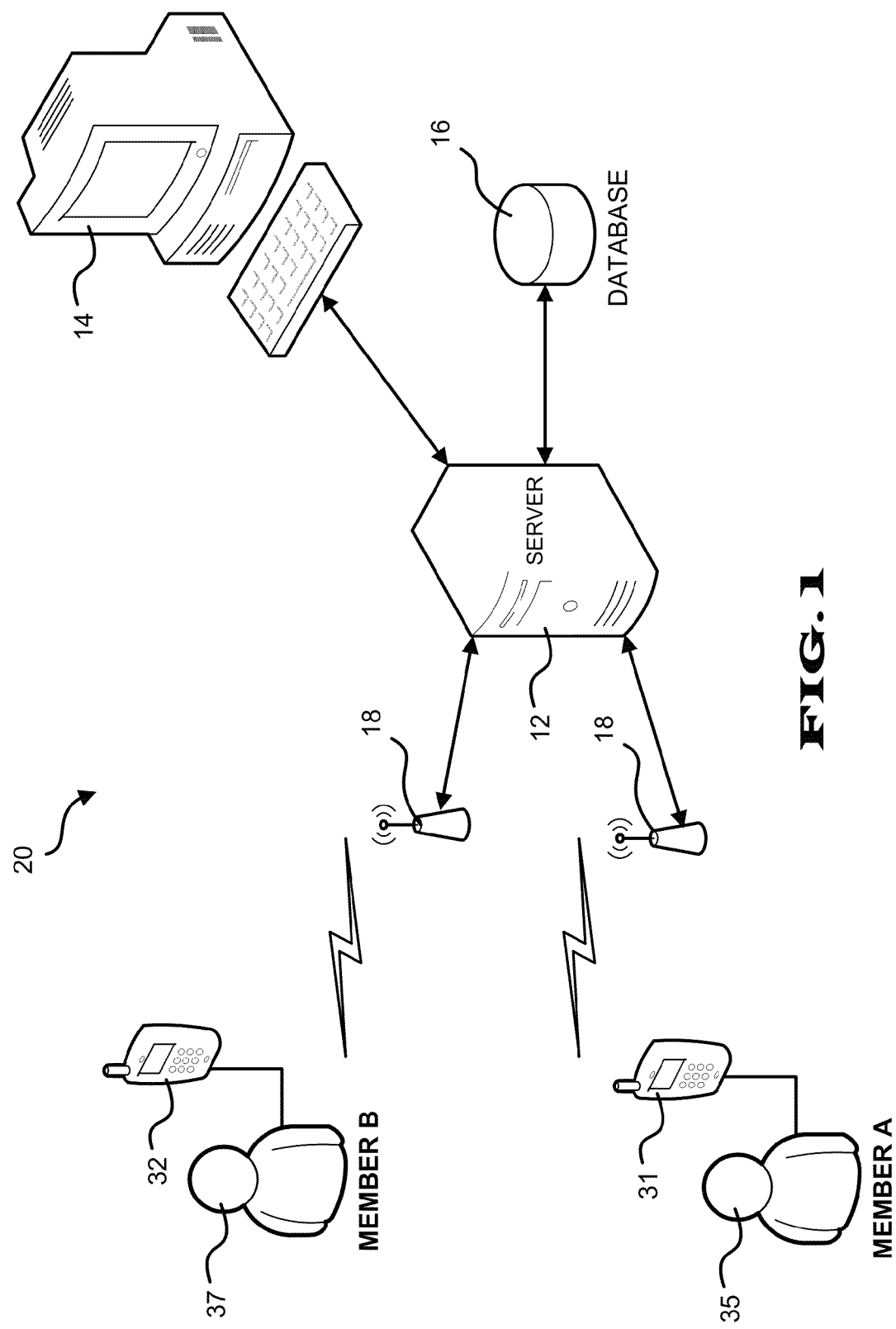

Referring to FIG. 1, an illustrative business use classification system 20 is provided that automatically classifies mobile device communications to determine when a mobile device's usage is so business related that the mobile device's communication billing should be assigned to a company which contracts or employs a particular user of the mobile device rather than to the particular user of the mobile device. In practice it is beneficial to implement the business use classification system 20 such that it automatically invoices the company to cover the costs of the business usage of a user's personal mobile device.

The business use classification system 20 is preferably configured as a top layer of a mobile device protocol that runs on a mobile carrier's infrastructure. The business use classification system 20 can take the form of an application that runs on a processor. The processor can be physically a part of a mobile device, a server, or other computing system, for example located at a physical location of the company implementing the business use classification system 20.

FIG. 1. Illustrates a prototypical system backbone of the business use classification system 20. As shown, a network carrier operates a processor controlled server 12 with access to a carrier database 16 and a communication system 18. The server 12 includes a processor and includes or has access to suitable non-transitory data storage including instructions for performing the method 200 described in more detail subsequently. The network carrier supports calling, text messaging and data transferring. For providing those services the network carrier generates bills for the services they provide. Those bills include charges for calling, text messaging and data transferring, each of which runs up charges based on different criteria, such as talk time, electronic texts, and data transfer size. Alternatively, the network carrier bills using a flat rate irrespective of talk time, electronic texts, and data transfer size. Alternatively, the network carrier bills using a flat rate for some services (e.g. data usage and calls and texts to phone numbers in the United States) and rates based on use for other services (e.g. calls and texts to phone numbers outside of the United States). The server 12 tracks the various criteria and computes final bills for members of the network carrier.

FIG. 1 shows the server 12 in communication with a company computer 14. Based on the usage of a mobile device owned by an employee or other associate of the company, and based on the business use of that mobile device, the server 12 can automatically invoice the company for the business use, such as directly via the computer 14. As an alternative, the network carrier can bill the mobile device owner and send him an invoice that he can give to the company. Numerous other billing schemes are, of course, possible.

The network carrier implements wireless communications over the communication system 18. That communication system 18 should be understood as including a network of cellular towers, internet links, phone lines, microwave towers, and other communication facilities.

In FIG. 1 the network carrier provides data, voice, Short Message Service (SMS), Multimedia Messaging Service (MMS) and other services to members of a carrier plan. In FIG. 1 those members are member A 35 having a mobile device 31 and member B 37 having a mobile device 32. The difference between the mobile device 31 and the mobile device 32 is that the mobile device 31 is assumed to be run in accord with the business use classification system 20 while mobile device 32 is not. Thus the company is invoiced for use of the mobile device 31 not mobile device 32.

The business use classification system 20 implements capabilities that relate to automatically classifying the use of the mobile device 31 as being either business related or personal. Classifying whether mobile device 31 usage is business related or personal is based on a series of classifier indicators that, when combined, determine with a high relative accuracy if a particular mobile device charge is for business purposes. Classifications are beneficially determined by a processor, such as the processor in the server 12, a processor in the mobile device 31, or a processor at the company, such as in the computer 14.

Figure 2:
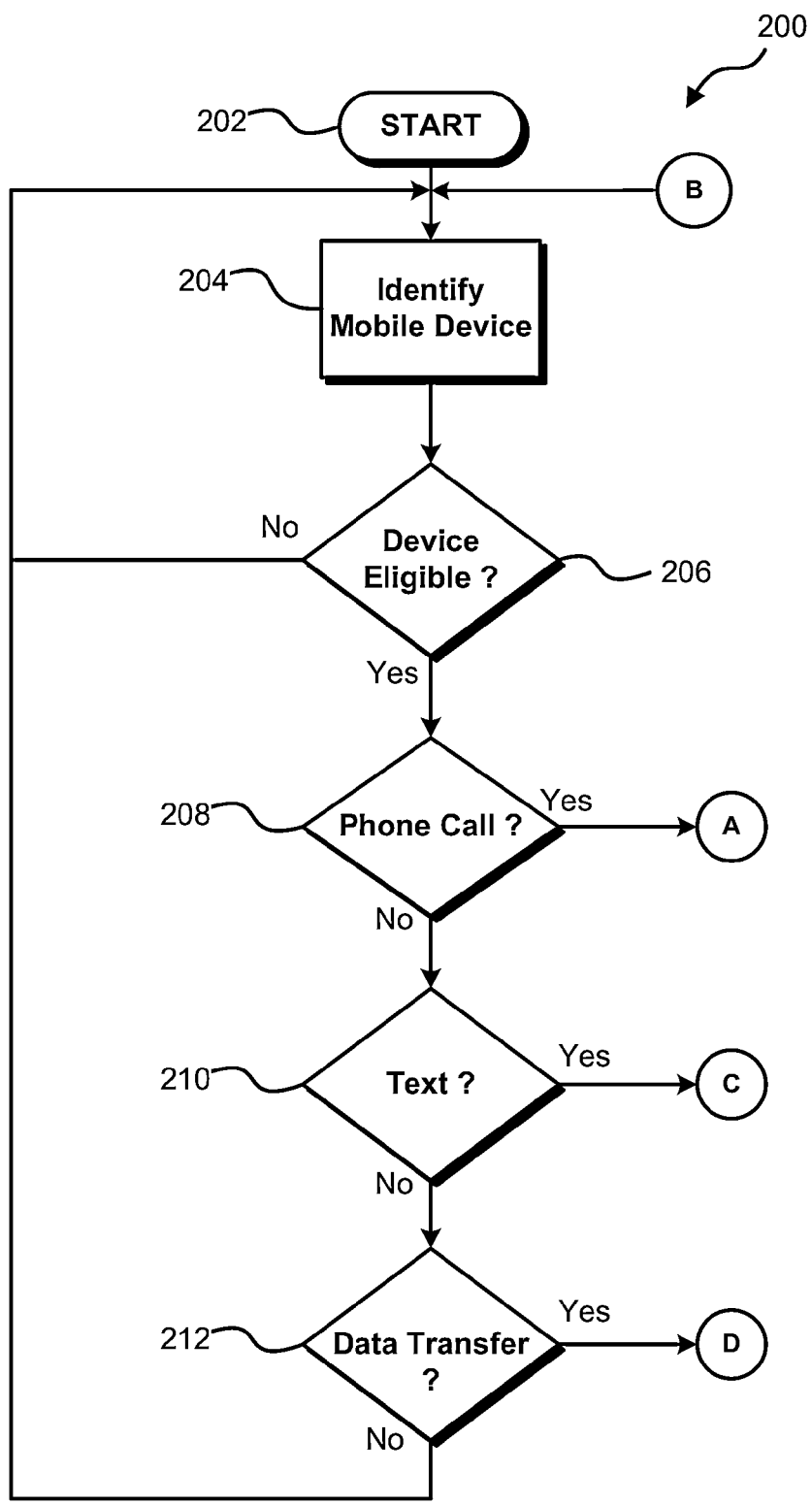
FIG. 2 is a flow diagram of a method of practicing the business use classification system of FIG. 1.

FIG. 2 presents a block diagram of a method 200 for implementing the business use classification system 200. The method 200 is run using one or more processors. The basis of the business use classification system 200 is that a company agrees to pay business charges for eligible mobile devices. Thus in FIG. 1 the mobile device 32 is not eligible for reimbursement or invoicing of business related charges while mobile device 31 is eligible. The method starts, step 202, and proceeds with identifying a mobile device that accesses the network carrier, step 204. A determination is then made as to whether the mobile device is eligible (e.g., mobile device 31), step 206. If the mobile device is not eligible, the method 200 loops back to step 204. Otherwise the method 200 proceeds with handling the billing of the network service.

The business use classification system 20 automatically classifies three types of network services as being either business related or personal: phone calls, text messaging and data transferring. The method 200 proceeds by determining if the mobile device network service involves a phone call, step 208. If not, the method 200 determines if the mobile device network service involves a text, step 210. If not, the method 200 determines if the mobile device 31 network service involves a data transfer, step 212. If not, the method loops back to step 204 to await a network service to classify.

Figure 3A:
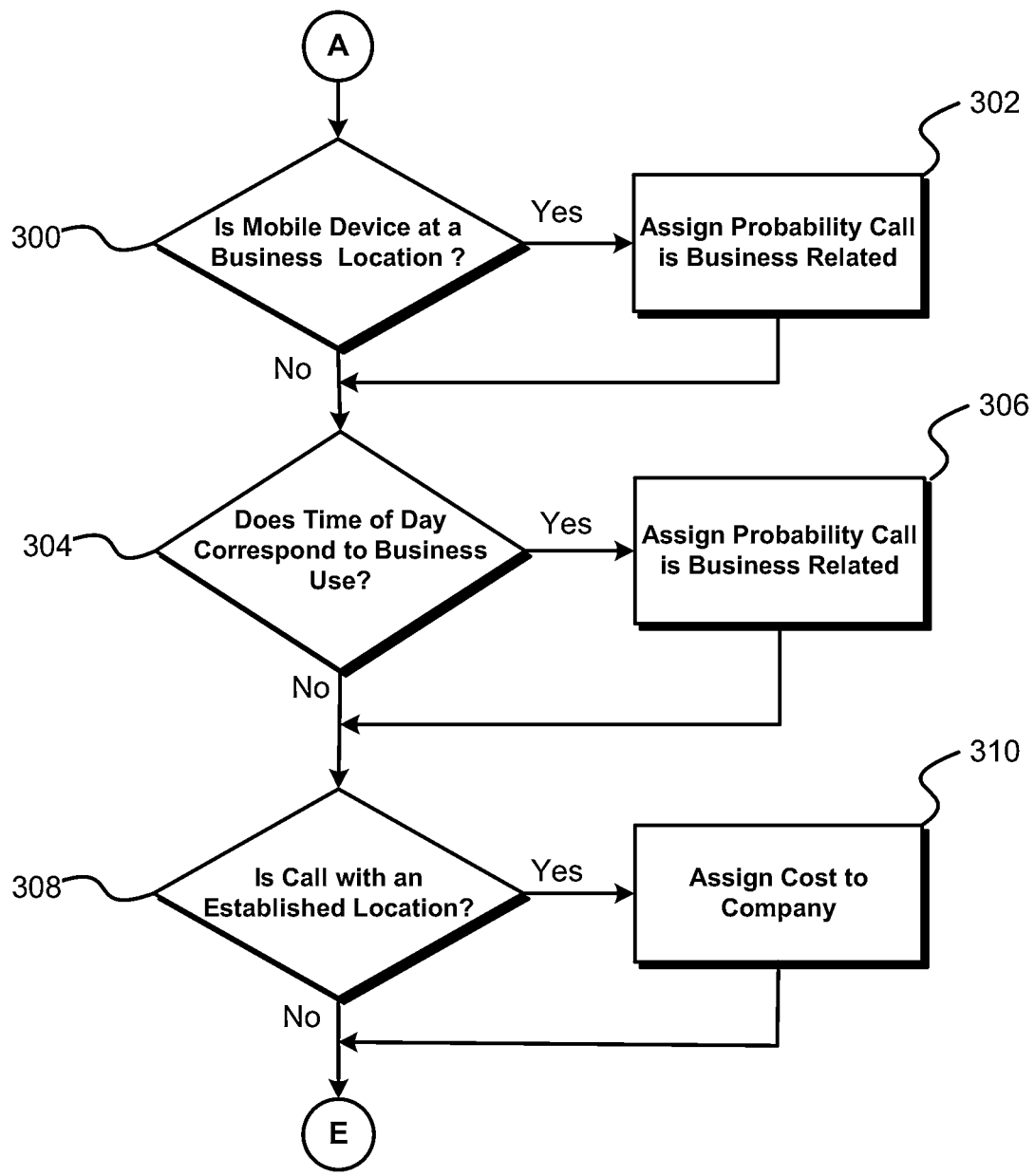
FIG. 3A is a flow diagram of handling phone calls in the method of FIG. 2.
Figure 3B:
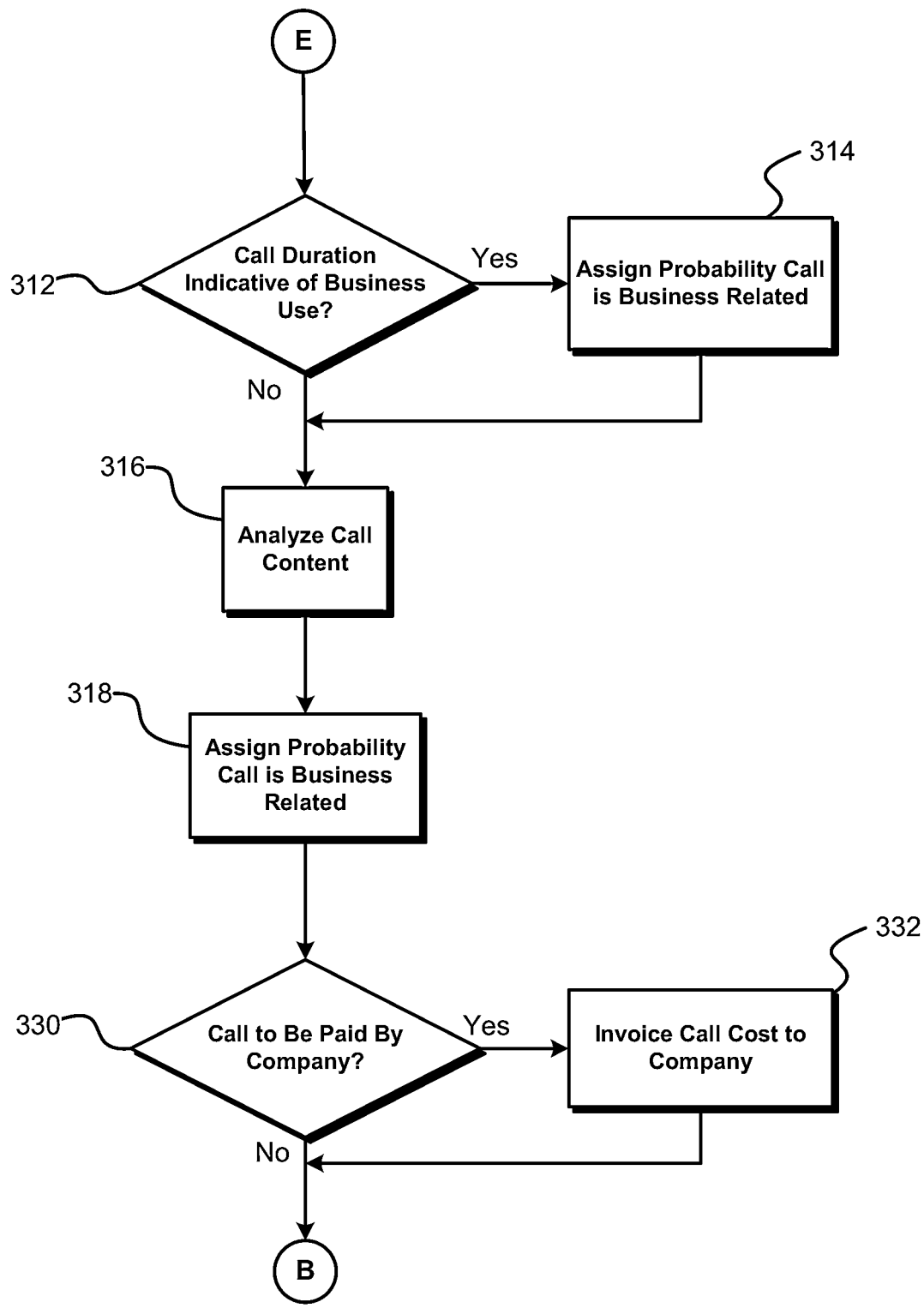
FIG. 3B is a continuation of the FIG. 3A.

Turning now to FIGS. 3A and 3B, if in step 208 the method 200 determines that the mobile device network service involves a phone call, the processor determines if the eligible device is at a company location, step 300. If the eligible device is at an office or other business location it increases the likelihood that mobile device usage is business related. An agreed upon probability (e.g., 70%) that the call is business related is assigned to that call, step 302.

Determining if an eligible mobile device is at an office or other business location can be performed based on mobile device GPS information, on mobile device communication network cell-tower triangulation, and/or on use of a company WiFi network or other local short range wireless network. In the case of WiFi, specific WiFi access points may be known and assigned to the company, or WiFi access points can be explicitly labeled as being part of the business. In any event, any communication between an eligible mobile device and a company WiFi access point presents a high probability that the mobile device is near the WiFi access points and that the communication is business related.

Next, the method 200 looks to the time of day to determine if the eligible device is being used for a business related purpose, step 304. For example, a mobile device 31 user can be an employee that works from 9 AM to 6 PM, Monday through Friday. If a mobile device 31 call occurs between the log in and log out times, that suggests business usage. In such case, an agreed upon probability (e.g., 70%) that the call is business related is then assigned to that call, step 306. Mobile device usage at other times suggests personal usage.

Next, the method 200 looks to determine if the call is with an established business related location, step 308. If the call is with an established business related location the cost of that call is assigned to the company, step 310.

Determining if a call is to a business related location can be established by the business themselves, such as by direct communication with the server 12 by the computer 14. A business related location can be a list of phone numbers, area codes, states, countries, or other geographic designations that the company is willing to assume that all phone calls are business related. Then, phone calls made or received from those phone numbers, area codes, states, countries, or other geographic designations can be automatically categorized as business calls. In addition to the exact phone numbers on that list a company can designate that calls made to or received from a phone number that is "close" to a phone number that has been designated as a business phone number, for example, differing only in the last 4 digits, or having a different extension, are automatically designated as business related communications. The network carrier operating the server 12 can also maintain a classification of a phone number as business or personal, which can be factored into determining a probability that a call is business or personal.

A phone number or contact can be classified by the network carrier, company or other entity not only as business and personal, but also as hybrid business/personal. For example an eligible mobile device 31 which makes both business and personal phone calls can be classified by the server 12 as a hybrid business/personal device. Calls made to a phone number corresponding to a hybrid device from an eligible device are assigned a lower probability of being business related than calls made from the eligible device to phone number corresponding to a non-hybrid business device or business contact. Similarly, calls made to a phone number corresponding to a hybrid business device from an eligible device are assigned a lower probability of being personal related than calls made from the eligible device to phone number corresponding to a non-hybrid personal device or personal contact.

A personal call can be made from a hybrid device (e.g., mobile device 31) to a business location. For example, a husband may call his wife on her company landline from his mobile device 31 regarding personal matters. The network carrier server 12 or other system can maintain a list of categories (e.g., plumbing supplies, pipe fittings, lumber, electronics) corresponding to business phone numbers and hybrid business/personal phone numbers and associated devices. When a business category of a hybrid device (e.g., mobile device 31) is related to a category of a destination phone in communication with the hybrid device, the carrier server 12 can assign a relatively high probability of the communication being business related. When a business category of a hybrid device such as the mobile device 31 is unrelated to a category of a destination phone in communication with the hybrid device, the carrier server 12 can assign a relatively low probability of the communication being business related. For example, if a particular hybrid device is assigned the category of "electronics manufacturer" and a particular business phone communicating with the hybrid device corresponds to the category of "daycare center", the carrier server 12 determines a relatively low probability of the communication being business related based on the categories being dissimilar and unrelated. In another example, if the particular hybrid device assigned the category of "electronics manufacturer" communicates with a particular business corresponding to the category of "circuit board supplier", the carrier server 12 determines a relatively high probability of the communication being business related based on the similarity and relatedness of the categories.

Next, the method 200 proceeds by determining if the duration of a phone call indicates that it is or is not business related, step 312. The probability that the phone call is business related is then determined, step 314. Since business calls tend to be shorter than personal calls a short call can be assigned a higher probability of being a business call than a longer call. Call length averaging is readily implemented by either the server 12 or the mobile device 31.

The method 200 then analyzes the content of a call to determine if the call is business related, step 316, and a probability that the call is business related is assigned based on that analysis, step 318.

A particularly valuable approach to analyzing the content of a call to determine if that call is business related is to use a speech-to-text translation. Such speech-to-text translations can be applied during conversations and then those translations can be input to a business speech classifier to determine whether the conversation is business or personal related. The content of the call can also be analyzed. If business categories are associated with the hybrid device (e.g., the mobile device 31), then converted text is matched against the business categories associated with the hybrid device to determine a probability that the call is business related. For example, a discussion about bulk plumbing supplies would be assigned a high probability of being business related for a hybrid device in the "plumbing" business category. Even without assigned categories, converted text of a call can be analyzed for a likelihood of being business related. For example, a discussion regarding bulk plumbing supplies is more likely to be business related than a discussion of a child's inappropriate behavior or a spousal disagreement, even in the absence of categorizing the device in the "plumbing" business category.

One approach to analyzing speech-to-text translations is to search for sentiment content and emotional qualities. Business interactions will usually have a lower degree of emotional overtones than personal communications and therefore lower degree of emotional overtone calls will be assigned a lower probability of being business related in step 318.

Another approach to analyzing speech-to-text translations is to search for tonal speech cadence. Business calls will tend to have tonal speech cadence that are more even or unemotional than personal conversations. Therefore phone calls having a lower degree of tonal speech cadence will be assigned a higher probability of being business related in step 318.

A determination is then made as to whether the call is to be paid by the company, step 330. That determination is made on the basis of the probability that the phone call is business related. If the determination is that the phone call should be paid by the company, an invoice is generated for the company to pay, step 332. Per usual business practices that invoice can include charges over a period of time and include charges for a number of calls, text messages and data transfers. It should be understood that the company can be invoiced even in the case where the account of an eligible device is subject to flat rate billing and calls are not subject to additional charges. For example the company can be invoiced a portion of that flat rate proportional to the business related use. After the determination is made the method 200 returns to step 204 to await further mobile device activities.

As previously noted phone calls are not the only network services that get billed by the carrier. Text messaging is another form of billed communications. In fact, text messaging is becoming more and more common and is often the preferred method of some communications.

Figure 4:
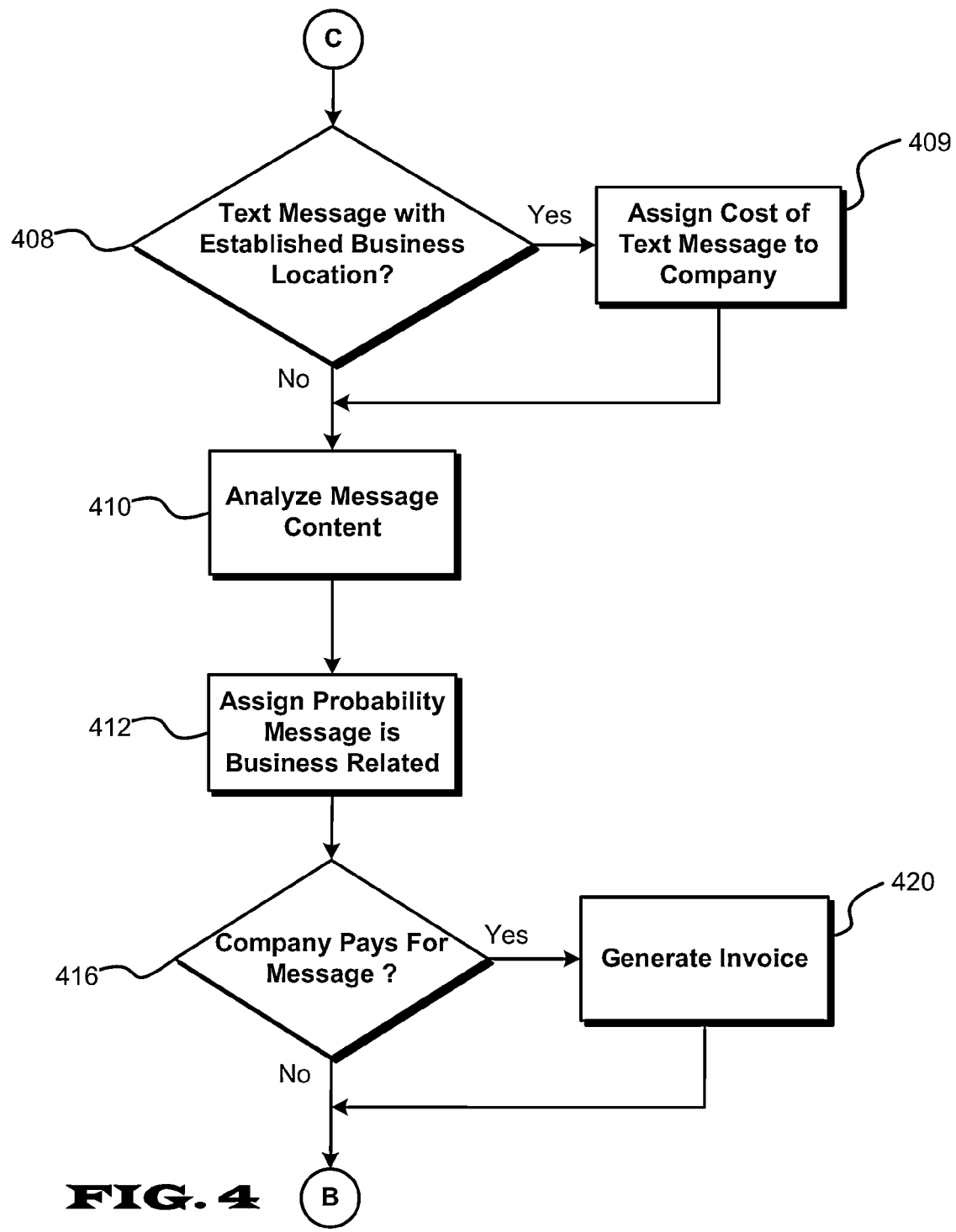
FIG. 4 is a flow diagram of handling text messages in the method of FIG. 2.

Returning to step 210 (FIG. 2), if the eligible device (e.g., mobile device 31) is text messaging (sending or receiving) a determination is made as to whether that text messaging is business related. Text messages can be analyzed in the manner that speech-to-text translations as described above are analyzed to determine a probability that text messages are business related. Referring also to FIG. 4, from step 210 the method 200 determines if the text messaging is with an established business related location, step 408. If the text messaging is with a business related location the cost of that text message is assigned to the company, step 409.

As with phone calls, business related locations for text messages can be established by the business themselves, such as by direct communication with the server 12 by the computer 14. A business related text location can be a list of phone numbers, area codes, email addresses, web addresses, states, countries, or other geographic designations that the company is willing to assume corresponds to business related communication. Then, text messages made to or received from that list of phone numbers, area codes, email addresses, web addresses, states, countries, or other geographic designations can be automatically categorized as business texts. In addition to the exact phone numbers or exact email addresses on that list, a company can designate that text messages made to or received from a phone number or email address that is "close" to a phone number or email address on that list is business related. For example, a phone number differing only in the last 4 digits, or having a different extension, or an email having the same domain name (e.g., "abccompany.com") and differing only in the local-part of the address prior to the "@" (e.g., "john.smith"), can be automatically designated as a business related communication. Text messages can be analyzed in the manner that speech-to-text translations as described above are analyzed to determine a probability that text messages are business related. Business categories corresponding to phone numbers from which text messages are made to or received from the eligible device 31 can be matched for example with business categories corresponding to the eligible device 31 or an employer of the user of the eligible device 31 to determine the probability that a text message is business related.

The method 200 then analyzes the content of the text message to determine if the text message is business related, step 410, and a probability that the text message is business related is then assigned based on that analysis, step 412.

One approach to analyzing the content of a text message and/or a set of text messages is to detect business related topics or interactions. Text messages can be input to a text classifier to determine whether the interaction is business or personal related.

Another approach to analyzing the content of a text message and/or a set of text messages is to it to analyze them for emotional qualities and overtones, for example wherein a communication including a relatively lesser degree of emotional overtones is designated as corresponding to a higher likelihood of being a business communication. The content of the text can also be analyzed. If business categories are associated with the hybrid device (e.g., the mobile device 31), then text is matched against the business categories associated with the hybrid device to determine a probability that the text is business related. Even without assigned categories, text can be analyzed for a likelihood of being business related.

A determination is then made as to whether the text message is to be paid by the company, step 416. If so, an invoice is generated for the company to pay for the text message, step 420. It should be understood that the company can be invoiced even in the case where the account of an eligible device is subject to flat rate billing and texts are not subject to additional charges. For example the company can be invoiced a portion of that flat rate proportional to the business related use. After the determination is made and/or the invoice is generated, the method 200 returns to step 204 to wait for further device activities.

Figure 5:
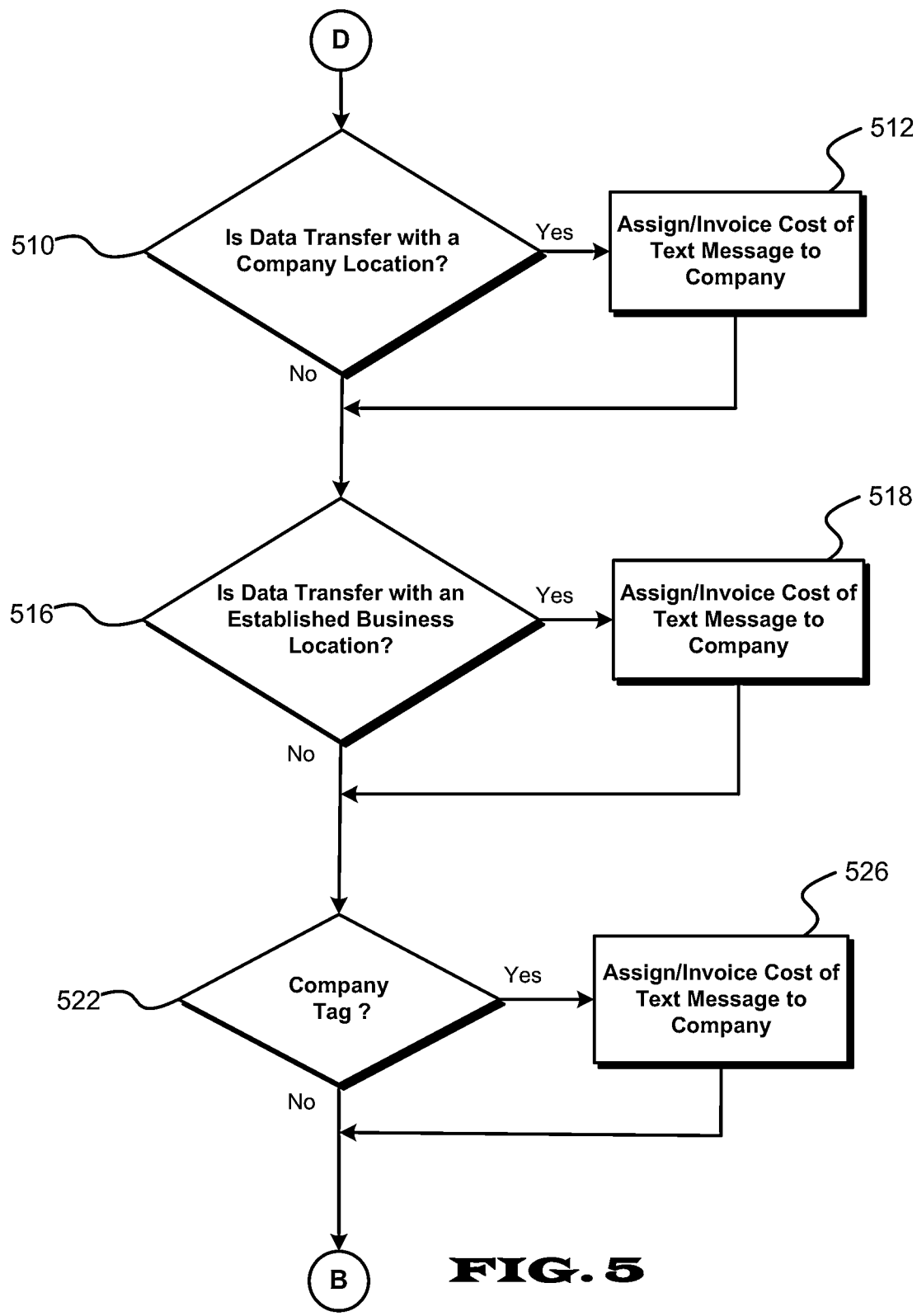
FIG. 5 is a flow diagram of handling data transfers in the method of FIG. 2.

Another network carrier billed service is providing mobile device data transfers. Data transfers are particularly important for businesses. Documents, calendars, contracts, engineering plans as well as raw data are commonly transferred over mobile devices. Returning to step 212 (FIG. 2), if the mobile device 31 is transferring data (sending or receiving) a determination is made as to whether that data transfer is business related. Referring also to FIG. 5, from step 212 the method 200 looks to determine if the data transfer is with a company location, step 510. If so, the method 200 proceeds by assigning and invoicing the cost of the data transfer to the company, step 512.

Next, the method 200 proceeds with a determination as to whether the data transfer is with an established business related location, step 516. If the data transfer is with an established business related location, that cost of that text message is assigned and invoiced to the company, step 518. It should be understood that the company can be invoiced even in the case where the account of an eligible device is subject to flat rate billing and data use is not subject to additional charges. For example the company can be invoiced a portion of that flat rate proportional to the business related use.

Similar with voice and text billing, a business can define a set of URL's (web sites, app downloads, drop box type data storage areas) from which data can be downloaded or uploaded and billed to the company. Apps frequently autonomously download data via a device. If an app is business related then data downloaded by the app via the device is designated as business related.

Another approach to determining if data transfers are business related is for the company to institute the use of company categorical tags into their data. Therefore, the method 200 can proceed with a determination as to whether a company tag is identified in the data transfer, step 522. If so, when tagged data is downloaded or uploaded it is readily identified as business related and the costs are then assigned and invoiced to the company, step 526. If a tag is missing, for example, a download of "Angry Birds", then the tag classifier step 522 does not assign the data transfer to be invoiced to the company. After step 522 or 526 the method 200 returns to step 204 to wait further device activity.

The business use classification system 20 and its illustrated method 200 implement a system for classifying mobile device usage as either business or personal related. If usage is business related, invoices are automatically prepared to cover the business related expenses. As indicated above, even in cases where Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims. For example, instead of an invoice the company could be billed directly.

What is claimed is:

1. A method for classifying use of a mobile device, the method comprising:
    defining at least one list of at least one of telephone numbers, area codes, states, countries or geographic designations;
    detecting a plurality of communications at least one of to the mobile device or from the mobile device;
    determining by at least one processor which of the plurality communications correspond to the at least one list;
    classifying the plurality of communications into at least one classification based on whether they correspond to the at least one list; and
    reporting the classifying of the plurality of communications.

2. The method of claim 1, further comprising:
    classifying ones of the plurality of communications which correspond to the at least one list in a first classification;
    reporting which of the plurality of communications correspond to the first classification.

3. The method of claim 2, further comprising:
    classifying ones of the plurality of communications which do not correspond to the at least one list in at least a second classification; and
    reporting which of the plurality of communications correspond to the second classification.

4. The method of claim 1, further comprising:
    determining a plurality of locations of the mobile device respectively corresponding to the plurality of communications;
    classifying the plurality of communications further based on the plurality of locations.

5. The method of claim 4, further comprising determining the plurality of locations based on communication with at least one WiFi access point.

6. The method of claim 4, further comprising determining the plurality of locations based on at least one of a global positioning system ("GPS") or cell tower triangulation.

7. The method of claim 1, further comprising:
    performing sentiment analysis on the plurality of communications to determine emotional qualities of the plurality of communications;
    classifying the plurality of communications further based on the emotional qualities of the plurality of communications.

8. The method of claim 1, wherein the plurality of communications comprise voice communications, the method further comprising:
    performing a speech to text translation on the voice communications to generate voice transcripts;
    performing sentiment analysis on the voice transcripts to determine emotional qualities of the voice communications; and
    classifying the plurality of communications further based on the emotional qualities of the voice communications.

9. The method of claim 1, wherein the plurality of communications comprise voice communications, the method further comprising:
    analyzing tonal speech cadence of the voice communications to determine a level of emotion in the voice communications; and
    classifying the plurality of communications further based on the level of emotion in the voice communications.

10. The method of claim 1, wherein the plurality of communications comprise voice communications, the method further comprising:
    assigning a business category to the mobile device;
    performing a speech to text translation on the voice communications to generate voice transcripts;
    analyzing the voice transcripts to determine when a topic of the communication corresponds to the assigned business category; and
    classifying the plurality of communications into business communications and personal communications based on the analyzing of the voice communication.

11. The method of claim 1, wherein the at least one list comprises at least one phone number, the method further comprising:
    determining that a particular communication is at least one of to the mobile device from a particular phone number or from the mobile device to the particular phone number, wherein the particular phone number differs from the at least one phone number by a number of digits not exceeding a predetermined number of digits; and
    classifying the particular communication based on determining that the particular communication is at least one of to the mobile device from the particular phone number or from the mobile device to the particular phone number.

12. The method of claim 1, wherein the at least one list comprises at least one phone number, the method further comprising:
    determining that a particular communication is at least one of to the mobile device from a particular phone number or from the mobile device to the particular phone number, wherein the particular phone number differs from the at least one phone number at most by the last four digits of the particular phone number; and
    classifying the particular communication based on determining that the particular communication is at least one of to the mobile device from the particular phone number or from the mobile device to the particular phone number.

13. The method of claim 1, wherein the plurality of communications comprise at least one of telephone calls, text messages, or electronic mail messages.

14. The method of claim 1, wherein classifying the plurality of communications comprises classifying the plurality of communications into business communications and personal communications.

15. The method of claim 1, wherein the plurality of communications comprise a text messages, the method further comprising:
    analyzing the text messages to detect at least one of business related or personal related topics; and
    classifying the plurality of communications into business communications and personal communications based on the analyzing of the text messages.

16. The method of claim 1, wherein the communications comprise text messages, the method further comprising:
    assigning a business category to the mobile device;
    analyzing the text messages to determine when a topic of the communication corresponds to the assigned business category; and classifying the plurality of communications into business communications and personal communications based on the analyzing of the text messages.

17. The method of claim 1, further comprising:
associating a plurality of categories to a list of telephone numbers;
associating at least one category to the mobile device;
detecting communication between the mobile device and a device corresponding to a listed telephone number;
comparing the at least one category of the mobile device with at least one category corresponding to the listed phone number of the device with which the mobile device communicates;
classifying the communication between the mobile device and the device corresponding to the listed telephone number based on the comparing.

18. The method of claim 1, wherein the communication comprises a text message, the method further comprising:
performing sentiment analysis on the text message to determine emotional qualities of the text message; and
classifying the plurality of communications into business communications and personal communications based on the emotional qualities of the text message.

19. The method of claim 1, further comprising:
defining a list of network locations;
determining which of the plurality of communications correspond to the list of network locations; and
classifying the plurality of communications into the at least one classification further based on whether they correspond to the list of network locations.

20. The method of claim 1, wherein reporting the classifying of the plurality of communications comprises invoicing for telecommunication services used by the mobile device based on the classifying of the plurality of communications.

21. The method of claim 20, wherein classifying the plurality of communications comprises classifying the plurality of communications into business communications and non-business communications, the method further comprising:
invoicing a first party based on communications classified as business communications; and
invoicing a second party based on communications classified as non-business communications.

22. The method of claim 1, wherein classifying the plurality of communications comprises assigning probabilities to the plurality of communications that the communications are at least one of business related or personal related.

23. A computing system comprising at least one non-transitory computer readable storage medium having encoded thereon instructions that, when executed by one or more processors of the system, cause the system to perform a process including:
defining at least one list of at least one of telephone numbers, area codes, states, countries or geographic designations;
detecting a plurality of communications at least one of to the mobile device or from the mobile device;
determining which of the plurality communications correspond to the at least one list;
classifying the plurality of communications into at least one classification based on whether they correspond to the at least one list; and
reporting the classifying of the plurality of communications.

24. Non-transitory computer-readable media tangibly embodying a program of instructions executable by at least one processor-enabled computing system to implement a method, the at least one computing system being capable of interfacing with a communications network, the method comprising:
defining at least one list of at least one of telephone numbers, area codes, states, countries or geographic designations;
detecting a plurality of communications at least one of to the mobile device or from the mobile device;
determining which of the plurality communications correspond to the at least one list;
classifying the plurality of communications into at least one classification based on whether they correspond to the at least one list; and
reporting the classifying of the plurality of communications.

* * * * *